E. L. DEMOREST.
TRACTOR WHEEL.
APPLICATION FILED MAR. 5, 1918.

1,336,074.

Patented Apr. 6, 1920.

Witness
A. Sundell

Inventor
Edmund L. Demorest

By
C. C. Shepherd Attorney

UNITED STATES PATENT OFFICE.

EDMURN L. DEMOREST, OF COLUMBUS, OHIO, ASSIGNOR TO JAMES ELLWOOD JONES, OF SWITCHBACK, WEST VIRGINIA.

TRACTOR-WHEEL.

1,336,074.  Specification of Letters Patent.  Patented Apr. 6, 1920.

Application filed March 5, 1918. Serial No. 220,633.

*To all whom it may concern:*

Be it known that I, EDMURN L. DEMOREST, a citizen of the United States, residing at Columbus, in the county of Franklin and State of Ohio, have invented certain new and useful Improvements in Tractor-Wheels, of which the following is a specification.

This invention relates to tractor wheels and is designed particularly as an improved structure for quickly transferring a tractor wheel from a smooth rim to a spiked or cleated rim to thereby materially increase the tractive effort of the wheel. This structure is designed particularly as a convenience as well as a saver of time when leaving a field and entering upon an improved highway or vice versa.

The main object of my invention resides in an improved structure whereby the spikes or cleats may be projected by means of the power transmitted to the driving wheel. Also, a further improved feature of my invention resides in a lost motion connection between the power transmitting member and the driving wheel, this lost motion being of an amount sufficient to move the spikes or cleats from one extreme position to the other. Further, my improved structure is designed to be readily accessible and quickly adjusted to any of its working positions.

Figure 1:
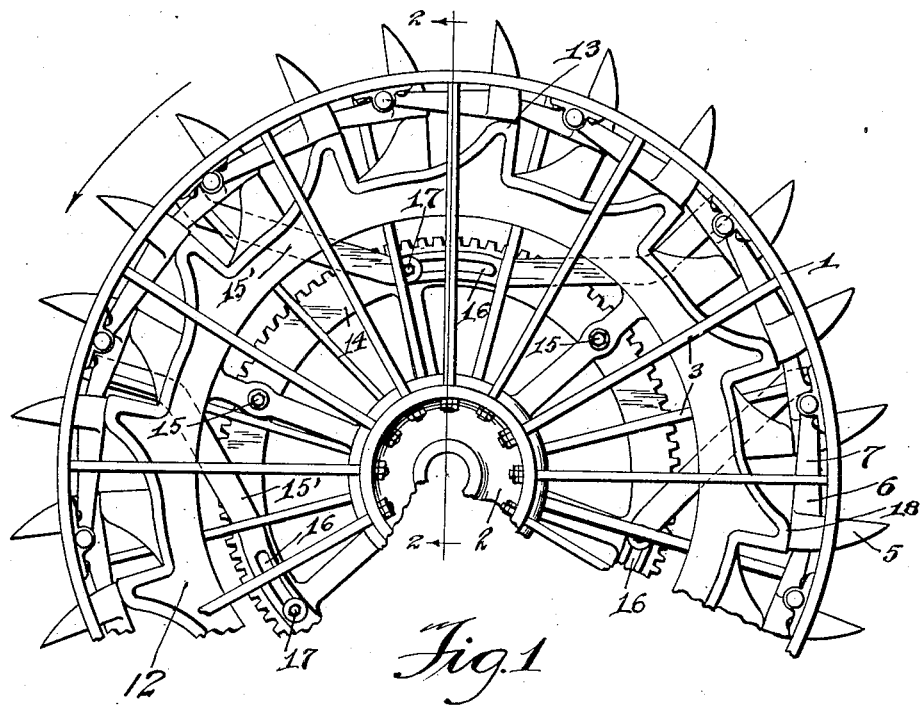
Figure 2:
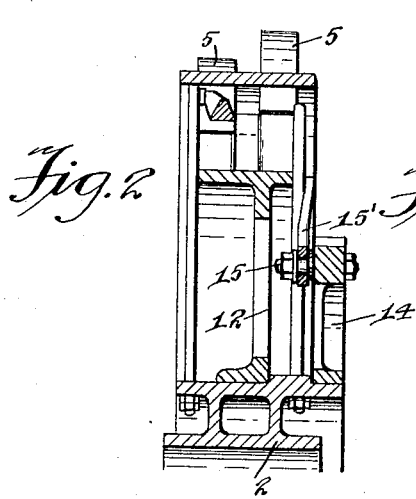
Figure 3:
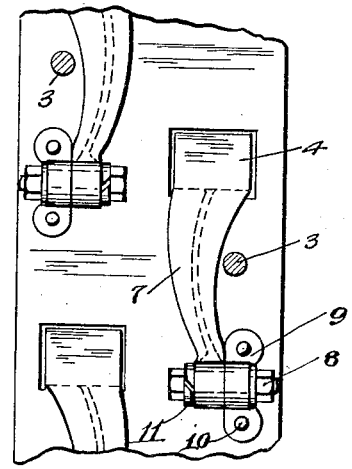

The preferred embodiment of my invention is shown in the accompanying sheet of drawings in which similar characters of reference designate corresponding parts and in which, Figure 1 is a view in side elevation of a portion of a tractor wheel with my invention applied thereto, Fig. 2 is a cross section taken on line 2—2 of Fig. 1 and looking in the direction of the arrows, and Fig. 3 is a bottom plan view showing the arrangement of spikes.

The tractor wheel is of the conventional type embodying a rim 1 and a hub 2 held in their assembled relation by means of a plurality of spokes 3. This rim is provided with a plurality of square apertures 4 preferably arranged in staggered relation through which the pointed ends 5 of a corresponding number of spiked members 6 project. These spiked members are preferably made of substantially right angular form and are pivotally secured by means of their long arms 7 to the inner side of the rim 1. The manner of attachment is best shown in Fig. 3 wherein it will be noted that the long arms 7 are curved somewhat to pass around the spokes 3 and are then hung upon pivot bolts 8, the latter also passing through the bearing members 9. These bearing members may be riveted or bolted to the inside of the rim as shown at 10 and a spring washer 11 is preferably interposed between the head of each bolt and the rear end of each spike member. By suitably tightening the nut of the pivot bolt, the tension of this spring washer may be regulated to securely hold the spiked members in their retracted positions as will be presently described and at the same time to eliminate all vibration noises and rattle.

The hub 2 rotatably carries a cam ring 12 so designated because of the plurality of cam surface 13 used for moving the spikes to their projected positions. Cam surfaces 13 are arranged to lie beneath the spikes in the manner shown in Fig. 1 and mechanism is provided whereby this cam ring may be moved through an arc sufficient to permit the retraction of the spikes as they come into engagement with the ground. It is in this position that the spring washers 11 come to play to frictionally hold the spikes in their retracted positions. The hub 2 of the wheel is also provided with a driving gear 14, this latter being rigidly secured to the cam ring 12 by means of the bolts shown at 15. This driving gear is also operatively connected with the driving wheel by means of a lost motion connection with the bands 15'. These bands 15' are arranged as chords across the rim 1 of the wheel and are rigidly secured to the inner side of this rim. These bands are also each provided with an arcuate slot 16 through which the bolts 17 carried by the gear 14 pass. The length of the arcs 16 is sufficient to permit the cam member to rotate through an arc which in turn permits the spikes 5 to move from one extreme position to the other.

The operation of my device is as follows:

As shown in Fig. 1, the wheel must be traveling lineally toward the left and consequently, should it be desired to retract the spikes 5, all that is necessary is to unloosen the bolts 17 and then apply power to the driving gear 14 long enough to at least move it through the arc of travel represented by the length of the slots 16. Inasmuch as the cam ring 12 is rigidly secured to the gear 14 by means of the bolts 15, this cam ring will also move through a corresponding arc of travel. This brings the cam surface 13 out from under the heels 18 of the spikes 5 so that subsequent rotation of the driving wheel upon the ground will move the spikes inwardly against the tension of the spring washers 11 and these latter will then in turn frictionally hold the spikes in their retracted positions. The bolts 17 may now be tightened up to form a rigid connection between the driving gear 14 and the wheel or the ends of the slots 16 may be relied upon to form this driving connection. When it is desired to project the spikes, the bolts 17 may be unloosened if they have been previously tightened and the direction of rotation of the driving gear 14 reversed for a sufficient length of time to bring the cam surfaces 13 beneath the heels 18 of the spikes. The bolts 17 are then tightened and a rigid driving connection between the gear and the wheel is thus formed.

What I claim is:

1. In a tractor wheel including a hub and a rim, said rim having a plurality of apertures therein, a plurality of substantially right angular spike members pivoted at one end to said wheel, a cam ring rotatably mounted on said wheel to move through an arc sufficient to project said spikes, a driving gear, and means for connecting said gear and said ring together whereby said spikes are moved by the power transmitted to said gear.

2. In a tractor wheel including a hub and a rim, said rim having a plurality of apertures therein, a plurality of spikes arranged to project through said apertures, a slotted band located across said rim, a driving member for turning the wheel connected to said band through its slotted opening, and a cam ring carried by said driving member for engaging said spikes.

3. In a tractor wheel including a hub and rim having a plurality of apertures therein, a plurality of substantially right angular spike members pivoted at one end to said wheel and arranged to project through said apertures at their other ends, a cam ring for engaging said spikes rotatably mounted on said hub, a plurality of slotted bands arranged as chords across said rim, a driving gear, means for connecting said gear to said bands through their slotted openings, and a rigid connection between said gear and said ring.

In testimony whereof I affix my signature.

ED. L. DEMOREST.